March 25, 1930.  C. G. BUTLER  1,752,270
LUBRICATING APPARATUS
Filed July 18, 1928
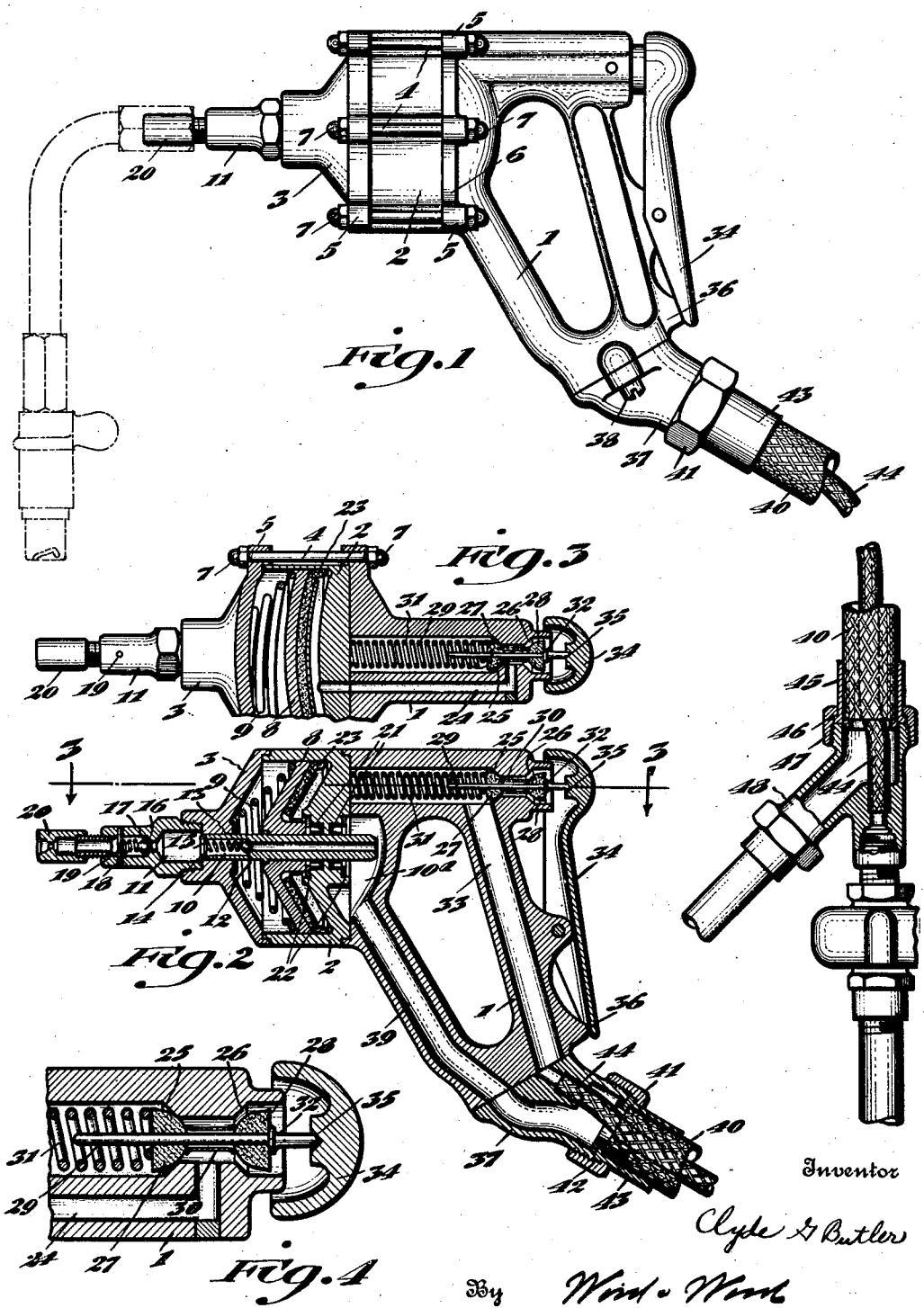

Patented Mar. 25, 1930

1,752,270

UNITED STATES PATENT OFFICE

CLYDE G. BUTLER, OF CINCINNATI, OHIO, ASSIGNOR TO THE CINCINNATI BALL CRANK COMPANY, OF CINCINNATI, OHIO, A CORPORATION OF OHIO

LUBRICATING APPARATUS

Application filed July 18, 1928. Serial No. 293,631.

This invention relates to pressure generating instrumentalities or pumps adapted to deliver lubricant under high pressure to bearings which are conventionally equipped with fittings cooperative with the nozzle on the end of a flexible hose line through which the lubricant is supplied from the pump.

The pressure generating instrumentality of this invention is pneumatically operated which is desirable for the reason that compressed air is quite commonly used about garages or factories for inflating tires or controlling machinery.

The lubricant is supplied to this instrumentality under slight pressure through a flexible hose line. This supplying pressure may be generated by any means convenient such as weight, a spring pressed plunger, a pump, or gravity if the lubricant is sufficiently fluid.

For convenience, the air and lubricant supplies are connected to the pressure generating instrumentality by means of a single conduit.

The pressure generating instrumentality is preferably operated by a trigger-like member, depression of which causes the air under pressure to eject a charge of lubricant, such as a fraction of an ounce under very high pressure such as five thousand pounds per square inch. The trigger must be released and again depressed to eject another charge.

It is the object of this invention to provide a pressure generating instrumentality which is light in weight, simple in structure, certain in operation, and which performs the utilities and operations set forth above collectively and severally.

Other objects and further advantages will be more fully set forth in a description of the accompanying drawings forming a part of this specification, in which:

Figure 1 is a general view showing the pressure generating instrumentality of this invention in side elevation.

Figure 2 is a longitudinal sectional view taken centrally of the device.

Figure 3 is a detailed sectional view taken on line 3—3, Figure 2, detailing the air inlet and control for the device.

Figure 4 is an enlarged detailed sectional view enlarged out of Figure 3, and detailing the air control valve.

The pressure generating instrumentality includes a handle member 1, a cylindrical cup 2 in which the pneumatic pressure is utilized, and a cylinder head 3 through which the lubricant passes. These three members are secured together by rods 4 threaded on each end which pass through bosses 5 peripherally disposed in the cylinder head 3 and the circular portion 6 of the handle 1 which bears against the base of the cylindrical cup 2. Nuts 7 are disposed on the ends of these rods and hold both the handle member 1 and the cylinder head 3 in engagement with the cylindrical cup 2 which is disposed between and held against lateral displacement by mating engagement with these two members.

Within this cylindrical cup 2 is a piston 8 which is pressed toward the side adjacent to the handle 1 by means of a coiled spring 9 under compression between the piston and cylinder head 3. This piston carries centrally a tubular member 10 which projects beyond it on both sides. One end of this tube is adapted to enter a recess 10$^a$ in the handle portion 1 and the other end is adapted to enter the chamber of a pressure cylinder 11 screw-threaded centrally into the outer end of the cylinder head 3.

The piston 8 is of conical form, the inclination thereof being from the center toward the rear. Likewise, the coil spring under compression is conical with its large end engaging in an annular groove in the margin of the piston and its small end engaging an annular groove in the cylinder head. As shown in Figures 2 and 3, the air inlet 24 is through the rear wall of the cylinder cup 2 and to one side of the center of the piston. Introduction of the air uniformly around the piston is impractical in combination with a central plunger and the particular handle used in this gun. For this reason, the piston is made conical so as to divert the rapidly entering air under pressure toward the center of the piston. This diversion of the air tends to lessen tipping or uneven thrust on the air piston and the entering air is made more effective for moving the piston.

The latter end of the tube 10 has a bore of greater diameter than the other end, the zone of meeting of these bores of different diameter constituting a valve seat 12. A ball valve 13 is held against this valve seat by a spring 14 under compression between the valve and the upset end portion 15 of the tube. This valve permits lubricant to pass from the recess in the handle through the tube into the high pressure cylinder but not in the reverse direction.

The end of the pressure cylinder adjacent to the cylinder head is of such size that tube 10 operates as a piston in it. The bore at the outer end of this pressure cylinder member is of smaller diameter and between the two bores is a passageway of small cross section. Between the latter and the bore in the outer end is a valve seat 16 against which a ball valve 17 is held by a spring 18 under compression between said ball and a pin 19 spanning the outer end of the bore. Lubricant may therefore pass through the outer end of the pressure cylinder but not in the reverse direction. A nozzle 20 is screwed into the outer end of the bore and to the nozzle 20 is secured the flexible hose line adapted to make connection with the fittings at the bearings.

The tubular member 10 is mounted in the piston with the hub of the piston shrunk over it. The tube extends through the base of the cylindrical cup 2 which is provided with packing washers 21 about the tubular member, these packing washers being held in place by retaining washers 22. The piston itself carries the conventional leather packing 23 on the side thereof on which the air pressure is developed.

The operation of this piston is controlled by mechanism mounted in the handle 1. This mechanism includes a bore in the upper portion of the handle member, said bore provided with a portion of lesser diameter. From this portion of lesser diameter an L-shaped passageway 24 extends to the interior of the cylinder in the cup member 2.

On either side of the portion of the bore of smaller diameter are valve seats 25, 26. The valve members cooperative therewith comprise two semi-circular members 27, 28, preferably made of some substance such as rubber, which are disposed on a rod 29 and spaced apart by a tube 30 between them. One of the semi-circular valve members is adapted to seat on each valve seat and the tube spacing them is disposed in the narrow portion of the bore between the valve seats.

A coiled spring 31 is held under compression between the inner valve member 27 and the base of the cup 2. The outer valve member 28 is held against displacement on the rod by an abutment 32. The air is introduced into the apparatus through the handle, a passageway 33 extending from the point of connection with a flexible conduit to the bore in the upper portion of the handle which houses the coiled spring 31.

When the valve mechanism is pressed inwardly thereof, compressed air is admitted through the L-shaped passageway 24 to the cylinder in the cup which drives the piston forwardly and expels the lubricant outwardly through the hose line. When pressure on the valve mechanism is relieved the coiled spring 31 presses the valve member 27 back against its seat thereby permitting the air in the cylinder to escape through the L-shaped passageway out past the valve member 28 which is no longer seated and to the outside.

This pressing of the valve mechanism is performed by means of a trigger 34 which is pivoted to the handle and provided with a cup-like upper end adapted to seat over the circular end of the handle portion which extends outwardly to house the valve member 28.

The trigger is also provided with an abutment 35 which engages the end of the rod 29 for pressing the same inwardly. The handle carries an abutment 36 positioned to engage the trigger on the other side of the pivot member from the valve mechanism to keep the upper end of the trigger in approximate engagement with the rod 29.

At the lower end of the handle is provided a three-way passageway member 37 which is connected to the handle by means of screws 38 which pass through lugs extending outwardly from both the three-way passageway member and the handle. The handle is provided not only with the air passageway extending to the bore housing the tubular spring, but also with the grease passageway 39 extending from the recess entered by the tubular member 10 down to the three-way passageway member.

One of the passageways of said member 37 connects with the air passageway 33 in the handle, another with the grease passageway 39 in the handle, and the third with a flexible conduit 40 secured to the lower end of the three-way passageway member by means of a union comprising a nut 41 which fits over the flange 42 of a terminal collar 43 on the end of said flexible conduit. Within said flexible conduit is a second flexible conduit 44 which connects directly to the passageway in the three-way passageway member which communicates with the air passageway through the handle.

At the other end of the large flexible conduit is disposed another union comprising a terminal collar 45 having a flange 46 over which a union nut 47 fits to secure said end of said conduit to a second three-way passageway member 48. The smaller flexible conduit 44 is connected directly to one passageway in said three-way passageway member 48, said passageway being threaded at its outer end to provide connection with a line supplying air under pressure. The other passageway of the three-way member is adapted to be connected to a line supplying lubricant under slight pressure.

In operation the lubricant under pressure passes through member 48 through the large flexible conduit 40, through the three-way passageway member 37, through the lubricant passageway 39 in the handle 1 into the recess 10ᵃ adjacent to the cup 2.

When the trigger is depressed, the piston in the cylinder 2 moves forwardly as previously described. Upon its return the tube 10 enters the recess which is filled with lubricant forcing some into its interior and through the valve in said tubular member 10. Upon subsequent forward strokes of the piston the lubricant is expelled through the valve at the forward end of the high pressure cylinder member and out through the flexible hose line to the bearing to be lubricated.

It will thus be observed that very high pressures can be generated in the lubricant since the air operates upon a piston of relatively great diameter whereas a piston of relatively small diameter operates upon the lubricant.

The proportions of the apparatus can be varied to give the desired amount of grease for each stroke. For many purposes a fraction of an ounce of grease is appropriate.

The pressure at which this lubricant can be expelled depends not only on the pressure of the valve air supply but on the relative diameters of the pistons. For most purposes it is expedient to proportion the parts to deliver lubricant under a pressure of five thousand pounds per square inch.

Each depression of the trigger, therefore, delivers only so much grease which is an advantage should the instrumentality be used by inexperienced or careless persons. The two conduits, one within the other is an advantage since there are fewer flexible conduit lines to become entangled.

The entire apparatus is light and can easily be carried about a factory or garage, is easily connected with sources of supply of air and lubricant, and permits the operator to assume a position most advantageous for observing the progress of the lubricating operation.

Having described my invention, I claim:

1. A grease gun, comprising, an air cylinder, a high pressure grease discharge cylinder secured on the forward end of the air cylinder, a handle carrying said cylinders and attached to the rear of the air cylinder, said handle having a supply chamber therein, a hollow plunger reciprocably mounted between said high pressure cylinder and said supply chamber, a valve in said plunger, said valve opening during rearward movement, an air actuated piston in said air cylinder connected to said plunger, means in the handle for controlling the air supply to the cylinder, said supply chamber of shallow depth and having the intake conduit thereof disposed at right angles to the plunger axis whereby the plunger moves toward the rear wall of the chamber for a positive displacement of grease through the plunger.

2. A grease gun, comprising, a handle, an air cylinder attached to said handle, a high pressure grease chamber attached to said air cylinder, a piston in said air cylinder, a hollow plunger piston carried by said air piston, a valve at the forward end of said plunger piston for closing the same on its forward stroke, said plunger piston extending into the high pressure grease chamber at its forward end, said handle having a grease intake passageway extending to the rear of the air cylinder, the rear end of said plunger piston entering said grease passageway, said handle having an air passageway extending to the rear side of the air piston, a valve in said rear air passageway, a trigger pivoted to the rear of said handle and operative, when compressed upon the handle, to control said valve.

3. A high pressure lubricating device, comprising, an air cylinder, a grease supply chamber, a conical piston in said cylinder, a hollow plunger piston axially secured to said conical piston, a high pressure chamber axially aligned with said plunger piston at the forward end thereof, a valve in said plunger for closing the passageway therethrough on a forward stroke, said plunger extending between the grease supply chamber and high pressure chamber, an air supply conduit connected to the interior of said air cylinder at the rear concave side of the piston and axially disaligned relative thereto, means for returning said piston, and means for controlling the introduction of air through the conduit.

In witness whereof, I hereunto subscribe my name.

CLYDE G. BUTLER.